Sept. 9, 1952     J. K. McKENDRY ET AL     2,610,315
MOTOR GENERATOR CIRCUIT
Filed March 4, 1949
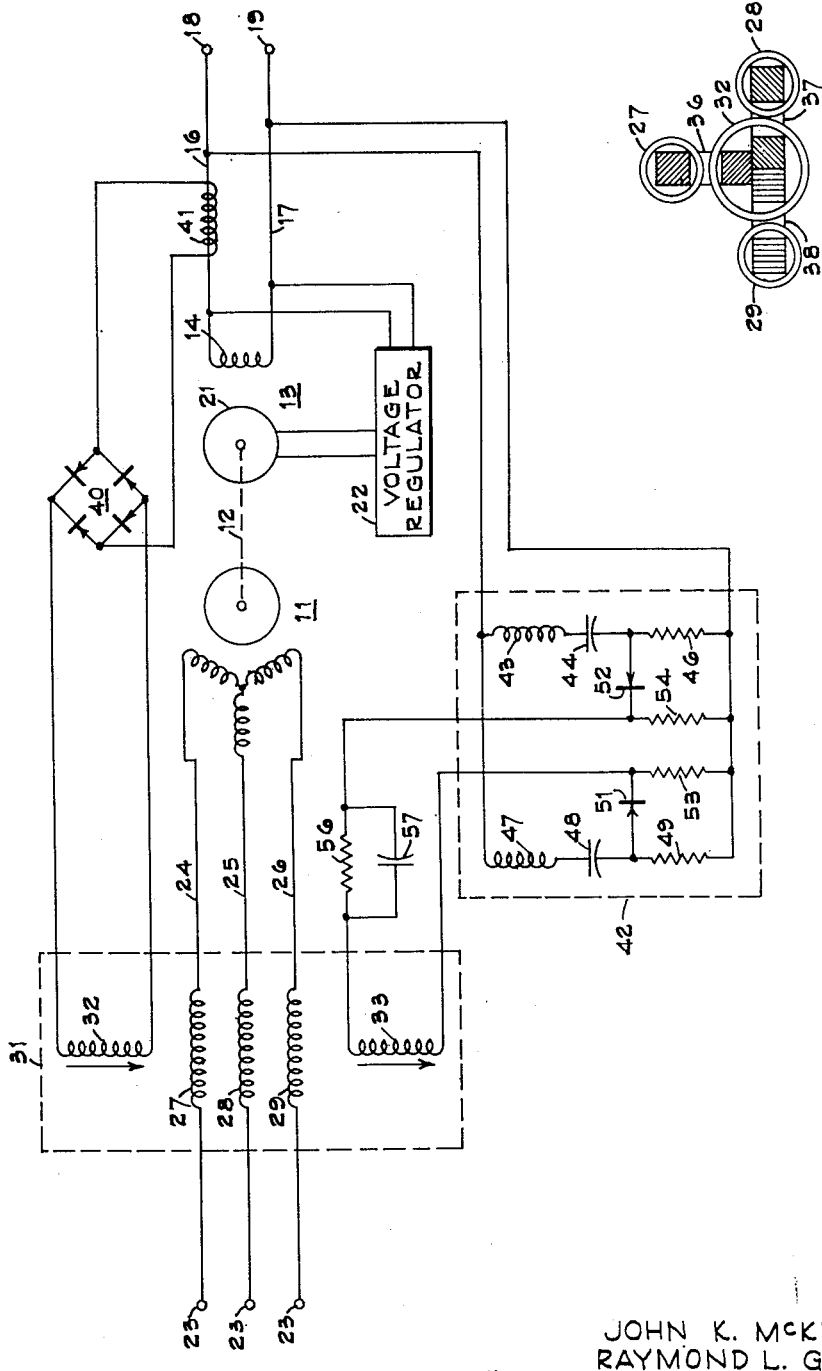
Inventors
JOHN K. McKENDRY
RAYMOND L. GARMAN
By H. L. Mackey
Attorney Patented Sept. 9, 1952

2,610,315

UNITED STATES PATENT OFFICE 2,610,315

MOTOR GENERATOR CIRCUIT

John K. McKendry and Raymond L. Garman, Pleasantville, N. Y., assignors to General Precision Laboratory Incorporated, a corporation of New York Application March 4, 1949, Serial No. 79,558

10 Claims. (Cl. 322—19)

1

This invention relates to a motor generator circuit wherein an alternating current is generated whose frequency is maintained within close limits of tolerance despite wide variations of load placed thereon and despite relatively wide fluctuations in the frequency and voltage of the supply utilized as the source of energy for the motor.

To accomplish the essential purpose of producing an output regulated within restricted limits regardless of variations in load and variations in supply both of frequency and voltage, the instant invention proposes the use of a saturable reactor to control the amount of energy supplied to the motor. By use of a control winding connected in an appropriate auxiliary circuit the saturable reactor is made sensitive to variations in load placed on the generator in such a manner that an increase in load results in increased energization of the motor which operates the generator and conversely a reduction in generator load reduces the motor energization so that the load placed on the system and the power supplied thereto are always equally balanced.

Additionally, the present invention utilizes a second control winding on the saturable reactor supplied with energy from a control circuit sensitive to frequency variations of the output. In this instance the control winding and control circuit are such that an increase in output frequency results in a decrease of motor energization and conversely a decrease in output frequency in an increase of motor energization. Thus the energy supplied to the motor is adjusted so as to compensate for any tendency for the output frequency to vary.

By using two control circuits, one operative in accordance with the variations in load on the generator and the other operative in accordance with variation in generator output frequency, certain advantages are gained which are not otherwise obtainable by the use of a single such control circuit.

In general the higher the loop gain of a closed system, the greater its tendency to instability and oscillation. In the present invention where extreme variations in load are to be expected these load variations are approximately compensated by the circuit operative in accordance with variations in load. Any residual variation which may then exist will be reflected in a variation in the frequency of the generator output which acting through the circuit operative in accordance with generator frequency provides the residual regulation necessary for extremely close control. This control circuit therefore may have a lower loop gain than would be required if it were to exercise the entire control function while still maintaining regulation within the desired restricted range of variation. Thus, accurate regulation is attained with greater stability of operation.

Additionally the load compensation circuit has an anticipatory function in that under sudden load changes a compensatory control is produced before the motor has changed speed to any degree. Thus this circuit acts to minimize transient as well as steady state errors, as well as providing the major first approximation control, the final more accurate control being left to the frequency compensator circuit.

Thus the instant invention is capable of producing an output whose frequency is substantially constant despite considerable variations in load conditions and inconstancy of supply.

The exact nature of the invention will be more readily understood from the following detailed description when considered together with the attached drawings in which:

Figure 1 is a schematic diagram of a preferred form of the invention.

Figure 2 is a view partly in section of one form of saturable reactor useful in the circuit of Fig. 1 and illustrating the locations of the various windings in relation to the core structure.

Referring now to Fig. 1, a three phase motor 11 operating through a shaft 12 constitutes the motive power for an alternating current generator 13. The output of the generator 13 derived from its stationary armature winding 14 is supplied through conductors 16 and 17 to terminals 18 and 19 to which any desired load may be connected. The revolving field 21 of the generator 13 is supplied with energy from the output circuit 16 and 17 through a voltage regulator 22 which may be made adjustable in order that the output voltage may be varied over a desired range.

The motor 11 is energized from a three phase source of supply indicated by terminals 23 through conductors 24, 25 and 26 each of which has in series therewith an alternating current windings 27, 28 or 29 of a saturable reactor indicated diagrammatically by the dotted rectangle 31.

As is well understood in the art an increase in saturation of the core of a saturable reactor decreases the impedance of its alternating current windings and a decrease in the saturation thereof increases the impedance of these windings. Therefore, the amount of energy supplied to the motor 11 is dependent on the impedance of the windings 27, 28 and 29 and hence the relative saturation of the reactor 31.

This effect is utilized to provide the various load and frequency controls contemplated by the present invention and to this end direct current control windings 32 and 33 are provided operating in a manner more fully described hereinafter to vary the energy supplied to the motor 11 to compensate for variations of load, voltage and frequency.

The saturable reactor 31 may be constructed as illustrated in Fig. 2 of three closed cores 36, 37 and 38, the control windings of which are common to all of the cores as indicated for simplicity by a single winding 32 and the alternating current windings 27, 28 and 29 of which are disposed on the remaining legs of the cores. By such an arrangement as is well understood in the art, the flux produced by the alternating current windings is neutralized insofar as the control windings are concerned but the flux produced by a direct current flow in a control winding directly affects the impedance of each of the alternating current windings.

Returning now to Fig. 1, the direct current control winding 32 acts to vary the energization of the motor 11 in accordance with the load imposed on the generator in such fashion that an increase in load increases the motor energization.

A current transformer 41 is connected to the output conductor 16 and the current induced therein is rectified by a full-wave rectifier 40 and the rectified output applied across the control winding 32. An increase in current drain of the output corresponding to an increased load results in an increase in current output of the transformer 41 and an increase in rectified current flowing through the control winding 32. This increase in current results in an increased saturation of the reactor core thereby reducing the impedance of windings 27, 28 and 29 and increasing the energy applied to the motor 11, thereby increasing the torque on the generator 13 to produce a stable output under the new increased load conditions. When the load is decreased an opposite effect takes place and stable output is likewise attained under reduced load conditions.

Merely restabilizing operation under changing load conditions while of primary importance, will not, however, produce unvarying operation at constant frequency under conditions of variable voltage and frequency of the supply source. Hence as an added means of stabilization a circuit is provided which is sensitive to changes in frequency of the output voltage and which acts to control the motor energization in such a direction as to correct for any variations as might occur.

To this end a frequency discriminator circuit indicated generally by the dotted rectangle 42 has its input connected in shunt to the output circuit and its output connected across the direct current control winding 33 which is so phased with respect to the control winding 32 that a flow of current in the direction of the arrow in the winding 33 produces a flux in the saturable reactor 31 which opposes the flux produced by the winding 32. Thus an increase in current in the winding 33 in the direction of the arrow decreases the saturation of the core, increasing the impedances of the alternating current windings 27, 28 and 29 and reducing the energization of the motor 11.

Any of the usual types of frequency discrimination circuits, which on increase of the frequency of energy applied to the output will produce an increase in direct current output in the direction indicated and conversely on decrease of frequency of input energy produces a decrease in direct current output or flow in the opposite direction, may be utilized in the present invention.

One such device which may be used to advantage is here illustrated by way of example, as consisting of a bridge network, one branch of which consists of a series resonant network 43 and 44 connected in series with a resistor 46. The other branch of the bridge is similar and consists of the series resonant network 47 and 48 in series with resistor 49.

The series resonant network 43 and 44, however, is tuned to resonance slightly above the desired output frequency, while the network 47 and 48 is tuned to resonance slightly below the desired output frequency. For example, if the output frequency is desired to be maintained at 400 C. P. S. the network 43 and 44 may be tuned to 405 C. P. S. and network 47, 48 to 395 C. P. S.

The output, if any, derived from the conjugate output terminals of this bridge circuit is rectified by the rectifiers 51 and 52 and the direct current voltage developed across resistors 53 and 54 connected in opposed relation is applied to opposite ends of the direct current control winding 33 through a stabilizing network of the phase lead type indicated diagrammatically by the resistor 56 and condenser 57.

Assume, for example, that the frequency of the output current tends to increase above the 400 C. P. S. desired. Then since this increased frequency approaches more nearly the resonance frequency of the network 43 and 44 the impedance of this arm is reduced and at the same time since the frequency of the current applied to the bridge circuit departs from the resonance frequency of the network 47 and 48 by a greater extent the impedance of this network increases. There is, then a reduced voltage drop across resistor 49 and an increased voltage drop across resistor 46, and these voltage drops translated to unidirectional voltage by the rectifiers 51 and 52 and caused to oppose each other by the resistors 53 and 54 result in a current flow through the winding 33 in the direction of the arrow. As heretofore stated, such a current flow produces a flux in the core which opposes that produced by the current flow in the winding 32 and hence the increased current flow decreases the saturation of the core and increases the impedance of windings 27, 28 and 29. The energy applied to the motor 11 is therefore reduced and since this results in a reduced torque applied to the generator 13 it in turn is caused to decrease in speed thus returning the frequency of the output to its desired value. By a similar operation, it will be apparent that a tendency for the output frequency to decrease below the desired value will result in more torque being applied to the generator causing its speed to increase and the output frequency to be returned to the desideratum.

Some delay is occasioned in this means of stabilizing the output frequency as a result of the inertia of the motor 11 and generator 13, some time being required before a change in motor energization is reflected in an equivalent change of generator speed and hence output frequency.

Absent any corrective means, this delay is liable to result in hunting or oscillation of the generator about the correct operating speed. To obviate any difficulty in this respect it is advisable to include a stabilizing network in the loop connecting the generator output to the control winding 33. In the present instance such a circuit is illustrated as comprising the resistor 56 and condenser 57 which acts as a phase lead or differentiating network so that the potential applied to the control winding 33 is not only responsive to change in output frequency of the generator 13 but is also responsive to the rate of change of such frequency. Other stabilizing or anti-hunt circuits as are well known in the art may be used with equal effect, the particular circuit shown being merely exemplary of this type of device.

It might be thought that the circuit comprising the frequency discriminator 42 and control winding 33 would be sufficient in and of itself to provide all the control desired since a variation in load in the absence of any other control would be reflected in a change in frequency of the generator output which acting in the manner aforesaid would vary the energy supplied to the motor in a corrective direction. Such is not the case, however, where extreme variations in load are to be expected. If the entire burden of regulation were to be placed on this circuit the gain around the loop consisting of reactor 31, motor 11, generator 13 and frequency discriminator 42 must be maintained at a fairly high level in order that steady state errors at the extremes of the operating range may be kept within permissible small limits. This necessary high gain of the loop, however, is inclined to produce instability of operation as is generally the case in high gain closed loop systems.

By first approximately compensating for load changes by the circuit including the current transformer 41, rectifier 40 and control coil 32 the great burden of control is removed from the circuit consisting of the frequency discriminator 42 and control coil 33. The gain of this latter circuit, then may be made relatively small while at the same time providing the final compensating action which maintains the output within the desired close tolerance range. Thus the required regulation is attained by the use of a lower gain loop circuit which has increased stability.

Additionally the circuit comprising the current transformer 41, rectifier 40 and control coil 32 has an anticipatory action not present in the circuit consisting of the frequency discriminator 42 and control coil 33. That is to say, sudden changes in load are instantly reflected in a change of motor energization before there is any significant change of motor speed and hence generator frequency. Thus transient as well as steady state errors are minimized.

Thus by interlocked controls operating through a single saturable reactor the present invention produces an output current having a frequency which may be substantially the same or different from the supply frequency but which is nevertheless held constant within close limits despite variations in load and in the supply.

While a single reactor is shown and described as producing a more economical arrangement, those skilled in the art will understand that a plurality of separate reactors may be used one for each conductor connected to the motor. Likewise the invention is not limited to the use of a three-phase motor although such a device is more convenient permitting the use of a single three-core reactor.

What is claimed is:

1. A motor generator circuit comprising, a source of alternating current supply for said motor, saturable reactor means having alternating current windings connected in circuit with said supply source and said motor, an alternating current output circuit for said generator, first control winding means associated with said saturable reactor means, circuit means interconnecting said output circuit and said first control winding means and operative in accordance with the current in said output circuit for varying the saturation of said saturable reactor means as the current in said output circuit varies, second control winding means associated with said saturable reactor means, circuit means interconnecting said output circuit and said second control winding means operative in accordance with the frequency of the voltage in said output circuit for varying the saturation of said saturable reactor means inversely as said frequency varies.

2. A motor generator circuit comprising, a source of alternating current supply for said motor, saturable reactor means having alternating current windings connected in circuit with said supply source and said motor, an alternating current output circuit for said generator, first control winding means associated with said saturable reactor means, current responsive means connected to said output circuit, a rectifier having its input connected to said current responsive means and its output connected to said first control winding means, second control winding means associated with said saturable reactor means and a frequency discriminator having its input connected to said output circuit and its output connected to said second control winding means.

3. A motor generator circuit in which a three-phase motor drives an alternating current generator comprising, a three-phase alternating current supply for said motor, a saturable reactor having alternating current windings in each of the conductors connecting said three-phase supply and said motor, first and second direct current control windings located on a common core portion of said saturable reactor, an output circuit for said generator, circuit means interconnecting said output circuit and said first control winding operative in accordance with the magnitude of the current in said output circuit for varying the saturation of said saturable reactor as the current in said output circuit varies and circuit means interconnecting said output circuit and said second control winding and operative in accordance with the frequency of the voltage in said output circuit for varying the saturation of said saturable reactor inversely as said frequency varies.

4. A motor generator circuit in which a three-phase motor drives an alternating current generator comprising, a three-phase alternating current supply for said motor, a saturable reactor having alternating current windings in each of the conductors connecting said three-phase supply and said motor, first and second direct current control windings located on a common core portion of said saturable reactor, an output circuit for said generator, current responsive means connected to said output circuit, a rectifier having its input connected to said current responsive means and its output connected to said first control winding and a frequency discriminator having its input connected to said output circuit and its output connected to said second control winding.

5. A motor generator circuit in which an alternating current motor drives an alternating current generator comprising, variable impedance means connected in the energization circuit of said motor, means magnetically associated with said impedance means for varying the impedance thereof inversely in accordance with the current variation in said generator output and means magnetically associated with said impedance means for varying the impedance thereof in accordance with the variation of frequency of said generator output.

6. A motor generator circuit in which an alternating current motor drives an alternating current generator comprising, variable impedance means connected in the energization circuit of said motor, means magnetically associated with said impedance means for varying the impedance thereof inversely in accordance with the current variation in said generator output, means magnetically associated with said impedance means for varying the impedance thereof in accordance with the variation of frequency of said generator output and means for varying said impedance means in accordance with the rate of change of frequency of said generator output.

7. A motor generator circuit comprising, a source of alternating current supply for said motor, saturable reactor means having alternating current windings connected in circuit with said supply source and said motor, an alternating current output circuit for said generator, first control winding means associated with said saturable reactor means, circuit means interconnecting said output circuit and said first control winding means operative in accordance with the current in said output for varying the saturation of said saturable reactor means as the current in said output circuit varies, second control winding means associated with said saturable reactor means, circuit means interconnecting said output circuit and said second control winding means operative in accordance with the frequency of the output voltage for varying the saturation of said saturable reactor means inversely as said frequency varies, and means for varying the saturation of said saturable reactor in accordance with the rate of change of output frequency.

8. A motor generator circuit comprising, a source of alternating current supply for said motor, saturable reactor means having alternating current windings connected in circuit with said supply source and said motor, an alternating current output circuit for said generator, first control winding means associated with said saturable reactor means, current responsive means connected to said output circuit, a rectifier having its input connected to said current responsive means and its output to said first control winding means, second control winding means associated with said saturable reactor means, a frequency discriminator having its input connected to said output circuit and its output connected to said second control winding means and a phase lead network connected in circuit with said frequency discriminator and said second control winding means.

9. A motor generator circuit in which a three-phase motor drives an alternating current generator comprising, a three-phase alternating current supply for said motor, a saturable reactor having alternating current windings in each of the conductors connecting said three-phase supply and said motor, first and second direct current control windings located on a common core portion of said saturable reactor, an output circuit for said generator, circuit means interconnecting said output circuit and said first control winding operative in accordance with the magnitude of the current in said output circuit for varying the saturation of said saturable reactor as the current in said output circuit varies, circuit means interconnecting said output circuit and said second control winding and operative in accordance with the frequency of the output voltage for varying the saturation of said saturable reactor inversely as said frequency varies and anti-hunt means associated with said last mentioned circuit means.

10. A motor generator circuit in which a three-phase motor drives an alternating current generator comprising, a three-phase alternating current supply for said motor, a saturable reactor having alternating current windings in each of the conductors connecting said three-phase supply and said motor, first and second direct current control windings located on a common core portion of said saturable reactor, an output circuit for said generator, current responsive means connected to said output circuit, a rectifier having its input connected to said current responsive means and its output connected to said first control winding, a frequency discriminator having its input connected to said output circuit and its output connected to said second control winding and a phase lead network connected in circuit with said frequency discriminator as said second control winding.

JOHN K. McKENDRY.
RAYMOND L. GARMAN.

REFERENCES CITED

The following references are of record in the file of this patent:

UNITED STATES PATENTS

| Number | Name | Date |
| --- | --- | --- |
| 1,448,902 | Shaffer | Mar. 20, 1923 |
| 1,710,755 | West | Apr. 30, 1929 |
| 1,728,403 | Finch | Sept. 17, 1929 |
| 1,767,052 | Crouse et al. | June 24, 1930 |
| 1,804,126 | Stoller | May 5, 1931 |
| 2,284,649 | Grabau | June 2, 1942 |
| 2,431,501 | Phillips | Nov. 25, 1947 |
| 2,462,751 | Koehler | Feb. 22, 1949 |